United States Patent
Lee et al.

(10) Patent No.: US 11,182,105 B2
(45) Date of Patent: Nov. 23, 2021

(54) STORAGE DEVICES, STORAGE SYSTEMS INCLUDING STORAGE DEVICES, AND METHODS OF ACCESSING STORAGE DEVICES

(71) Applicant: Samsung Electronics Co., Ltd., Suwon-si (KR)

(72) Inventors: SeokHeon Lee, Suwon-si (KR); Won-Gi Hong, Seoul (KR); Youngmin Lee, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/360,547

(22) Filed: Mar. 21, 2019

(65) Prior Publication Data

US 2019/0391755 A1 Dec. 26, 2019

(30) Foreign Application Priority Data

Jun. 26, 2018 (KR) .................. 10-2018-0073343

(51) Int. Cl.
*G06F 3/06* (2006.01)
*G06F 12/02* (2006.01)

(52) U.S. Cl.
CPC .......... *G06F 3/0658* (2013.01); *G06F 3/0611* (2013.01); *G06F 3/0625* (2013.01); *G06F 3/0638* (2013.01); *G06F 3/0679* (2013.01); *G06F 3/0688* (2013.01); *G06F 12/0246* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 7,735,024 | B2 | 6/2010 | Li |
| 9,323,468 | B2 | 4/2016 | Oyama |
| 9,373,380 | B2 | 6/2016 | Kim |
| 9,530,178 | B2 | 12/2016 | Herr |
| 10,248,317 | B2 * | 4/2019 | Yano ...................... G06F 3/0656 |
| 2001/0018717 | A1 | 8/2001 | Shimotono |
| 2009/0144501 | A2 * | 6/2009 | Yim ...................... G06F 12/122 711/120 |
| 2013/0086315 | A1 | 4/2013 | Kim |
| 2014/0071753 | A1 * | 3/2014 | Shin ........................ G11C 16/10 365/185.03 |
| 2014/0181363 | A1 * | 6/2014 | Hoang ................... G11C 16/22 711/103 |
| 2017/0068621 | A1 * | 3/2017 | Watanabe ........... G06F 12/0871 |
| 2017/0178275 | A1 | 6/2017 | Cohen |

* cited by examiner

*Primary Examiner* — Brian R Peugh
(74) *Attorney, Agent, or Firm* — Myers Bigel, P.A.

(57) ABSTRACT

A storage device may include a first storage area, a second storage area, and a controller. The controller may be configured to provide device information containing information on the first and second storage areas to an external host device, to allow a first access type of the external host device to the first storage area, and to allow a second access type of the external host device to the second storage area.

20 Claims, 15 Drawing Sheets

FIG. 5

| Transaction Type (B0) | Flags (B1) | LUN (B2) | Task Tag (B3) |
|---|---|---|---|
| (B4) IID \| CST | Reserved (B5) | Reserved (B6) | Reserved (B7) |
| EHS Length (B8) | Reserved (B9) | (B10) Data Segment Length | (B11) |
| (B12) | (B13) Expected Data Transfer Length | (B14) | (B15) |
| CDB (B16) | CDB (B17) | CDB (B18) | CDB (B19) |
| CDB (B20) | CDB (B21) | CDB (B22) | CDB (B23) |
| CDB (B24) | CDB (B25) | CDB (B26) | CDB (B27) |
| CDB (B28) | CDB (B29) | CDB (B30) | CDB (B31) |

FIG. 6

| Transaction Type (B0) | Flags (B1) | LUN (B2) | Task Tag (B3) |
|---|---|---|---|
| (B4) IID \| 01h | File System LUN (B5) | Reserved (B6) | Reserved (B7) |
| (B8) | (B9) | (B10) | (B11) |
| Logical Block Address ||||
| (B12) | (B13) | (B14) | (B15) |
| Expected Data Transfer Length ||||
| Opcode (B16) | Reserved (B17) | Reserved (B18) | Reserved (B19) |
| Reserved (B20) | Reserved (B21) | Reserved (B22) | Reserved (B23) |
| Reserved (B24) | Reserved (B25) | Reserved (B26) | Reserved (B27) |
| Reserved (B28) | Reserved (B29) | Reserved (B30) | Reserved (B31) |

STORAGE DEVICES, STORAGE SYSTEMS INCLUDING STORAGE DEVICES, AND METHODS OF ACCESSING STORAGE DEVICES

CROSS-REFERENCE TO RELATED APPLICATION

This U.S. non-provisional patent application claims priority under 35 U.S.C. § 119 to Korean Patent Application No. 10-2018-0073343, filed on Jun. 26, 2018, in the Korean Intellectual Property Office, the entire contents of which are hereby incorporated herein by reference.

BACKGROUND

The present disclosure relates to semiconductor devices, and in particular, to storage devices supporting at least two types of access, storage systems including the storage devices, and methods of accessing storage devices.

A storage system may include a main memory and a secondary memory. The main memory may be configured to support a high-speed access, and the secondary memory may be configured to support a nonvolatile storage function. A processor of the storage system may be configured to store data in the secondary memory and to load the data on the main memory when it is necessary.

As various functions are applied to the storage system, an auxiliary processor may be employed to support the processor. For example, the auxiliary processor may be configured to access data loaded on the main memory. Thus, when specific data are needed by the auxiliary processor, the specific data may be loaded on the main memory by the processor (e.g., a main processor).

Time and resources may be consumed to load the specific data on the main memory. In addition, power may be consumed to maintain the specific data on the main memory.

SUMMARY

Some embodiments of the inventive concepts provide storage devices, which are configured to reduce consumption of time, resources, and power, storage systems including such a storage device, and methods of accessing such a storage device.

According to some embodiments of the inventive concepts, a storage device may include a first storage area, a second storage area, and a controller. The controller may be configured to provide device information containing information on the first and second storage areas to an external host device, to allow a first access type of the external host device to the first storage area, and to allow a second access type of the external host device to the second storage area.

According to some embodiments of the inventive concepts, a storage system may include a random access memory, a storage device including a first storage area and a second storage area, a first processor configured to load first data stored in the first storage area on the random access memory and to access the first data loaded on the random access memory, and a second processor configured to directly access second data stored in the second storage area.

According to some embodiments of the inventive concepts, a method of accessing a storage device including a first storage area and a second storage area may include accessing the first storage area based on a file system and accessing the second storage area independent of the file system.

According to some embodiments of the inventive concepts, a storage system may include a random access memory, a storage device comprising a first storage area and a second storage area, a first processor configured to access the first storage area utilizing a first access type having a first unit size, and a second processor configured to access second data stored in the second storage area utilizing a second access type having a second unit size that is different from the first unit size.

BRIEF DESCRIPTION OF THE DRAWINGS

Example embodiments of the inventive concepts will be more clearly understood from the following brief description taken in conjunction with the accompanying drawings. The accompanying drawings represent non-limiting, example embodiments of the inventive concepts as described herein.

FIG. 5 illustrates an example of a command associated with a first storage area.

FIG. 6 illustrates an example of a command associated with a second storage area.

It should be noted that these figures are intended to illustrate the general characteristics of methods, structure, and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions, and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown.

Figure 1:
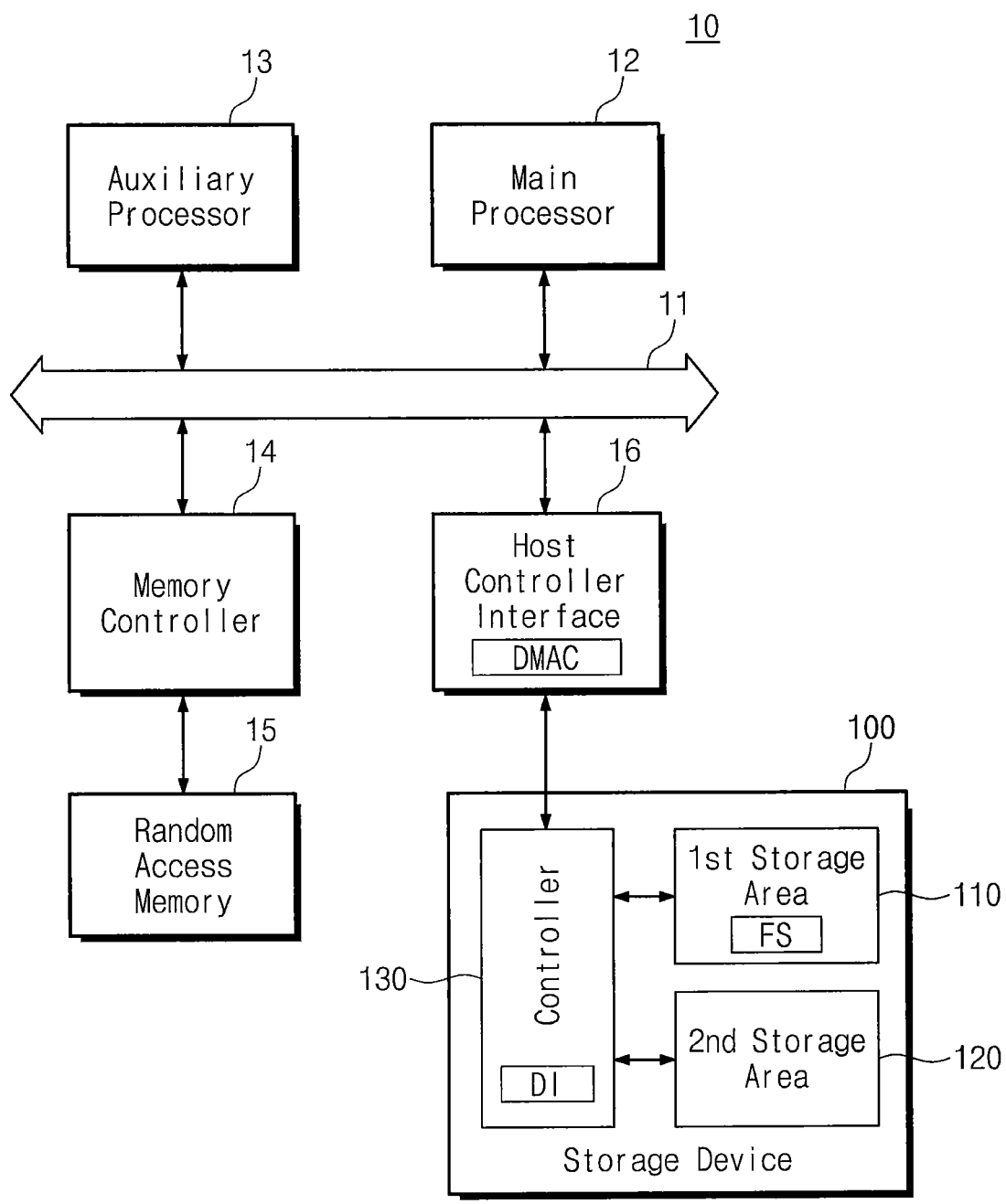
FIG. 1 is a block diagram illustrating a storage system according to some embodiments of the inventive concepts.

FIG. 1 is a block diagram illustrating a storage system 10 according to some embodiments of the inventive concepts. The storage system 10 may include, for example, at least one of a fixed device (e.g., a computer and/or server) or a mobile device (e.g., a smart phone, laptop computer, and/or tablet computer). Referring to FIG. 1, the storage system 10 may include a bus 11, a main processor 12, an auxiliary processor 13, a memory controller 14, a random access memory 15, a host controller interface 16, and/or a storage device 100.

The bus 11 may provide a channel between elements constituting the storage system 10. For example, the bus 11 may include a Peripheral Component Interconnect express (PCIe) or an Advanced eXtensible Interface (AXI), but the inventive concepts are not limited thereto. For example, other types of interfaces may be used for the bus 11 without deviating from the inventive concepts described herein.

The main processor 12 may control the storage system 10 and execute an operating system and applications of the storage system 10. The main processor 12 may include a Central Processing Unit (CPU) and/or an Application Processor (AP).

The auxiliary processor 13 may execute a task that is allocated from the main processor 12, according to a request of the main processor 12. For example, the auxiliary processor 13 may include a Graphic Processing Unit (GPU) or a Neuromorphic Processing Unit (NPU) executing, for example, a graphic task, a computational task, and/or a machine learning based classification task, which may be allocated from the main processor 12.

The memory controller 14 may control the random access memory 15. The memory controller 14 may store and/or read data in and/or from the random access memory 15 according to a request of the main processor 12, the auxiliary processor 13, or any other element.

The random access memory 15 may include a Dynamic Random Access Memory (DRAM). The random access memory 15 may be identified as a main memory by the main processor 12. The main processor 12 may allocate addresses (e.g., logical addresses and/or a virtual addresses) to the random access memory 15 in accordance with an address allocation method of the main memory and may request the memory controller 14 to access the random access memory 15 based on the allocated addresses.

The host controller interface 16 may control the storage device 100. The host controller interface 16 may request the storage device 100 to execute a write and/or read operation in response to a request of the main processor 12 and/or the auxiliary processor 13. The host controller interface 16 may include a direct memory access controller DMAC.

The direct memory access controller DMAC may access the random access memory 15 through the memory controller 14 in accordance with instructions (or delegation) from the main processor 12. For example, the direct memory access controller DMAC may store data, which are read from the storage device 100, in the random access memory 15. The direct memory access controller DMAC may read data from the random access memory 15 and transmit the read data to the storage device 100.

For example, the main processor 12 may provide addresses of a storage space, which is a part of a storage space of the random access memory 15 and may be used for reading and/or writing data by the direct memory access controller DMAC, to the direct memory access controller DMAC. The direct memory access controller DMAC may store data in and/or read data from the storage space of the provided addresses.

The storage device 100 may provide a nonvolatile storage space. The storage device 100 may include a first storage area 110, a second storage area 120, and/or a controller 130. The first storage area 110 and the second storage area 120 may be implemented with at least one nonvolatile memory device.

For example, the first and second storage areas 110 and 120 may be implemented with a single nonvolatile memory device and may be logically divided by addresses. In certain embodiments, the first and second storage areas 110 and 120 may be implemented with different nonvolatile memory devices that are physically separated from each other.

The first storage area 110 and the second storage area 120 may be implemented with one of various nonvolatile memories, such as flash, phase-change, magnetic, ferroelectric, and resistive memories, though the present inventive concepts are not limited thereto.

The storage device 100 may be implemented, for example, based on universal flash storage (UFS) specification. Specifications for the UFS storage format are provided by the Joint Electron Device Engineering Council (JEDEC) Solid State Technology Association. The first storage area 110 and the second storage area 120 may be implemented with different logical units.

The first storage area 110 may store a file system FS. The first storage area 110 may be managed by the file system FS. The second storage area 120 may be managed independent of the file system FS.

The controller 130 may access the first and second storage areas 110 and 120 in response to a request from the host controller interface 16 and/or in accordance with an internal schedule. The controller 130 may be configured to distinguish a first access type request on the first storage area 110 and a second access type request on the second storage area 120 that are received from the host controller interface 16.

For example, according to (e.g., based on) the first access type request and the second access type request, the controller 130 may access the first storage area 110 in a first manner and/or may access the second storage area 120 in a second manner. In some embodiments, the first manner of access may be different from the second manner of access.

The controller 130 may include device information DI. The device information DI may represent that the storage device 100 supports the first and second storage areas 110 and 120 separately.

The controller 130 may provide the device information DI to the host controller interface 16 when the storage system 10 is initialized. The device information DI may allow the host controller interface 16 to inform the main processor 12 that the storage device 100 supports the first and second storage areas 110 and 120.

Based on the device information DI, the main processor 12 may be informed that the first storage area 110 is managed by the file system FS and the second storage area 120 is independent of the file system FS. The main processor 12 may read a master boot record MBR (e.g., see FIG. 4) of the first storage area 110 and then may execute a booting (and/or boot loading) process.

The main processor 12 may identify the storage space of the first storage area 110 as a secondary memory. The main processor 12 may allocate addresses (e.g., logical addresses and/or virtual addresses) of the secondary memory to the first storage area 110. The main processor 12 may read the file system FS and may manage the first storage area 110, based on the file system FS.

The main processor 12 may identify the second storage area 120 as a pseudo main memory. For example, in some embodiments, the main processor 12 may identify the second storage area 120 as an alternate and/or supplemental main memory that may be used in addition to the main memory. The main processor 12 may allocate addresses (e.g., logical addresses and/or virtual addresses) of the main memory to the second storage area 120.

The main processor 12 may inform the auxiliary processor 13 of addresses of the second storage area 120 and/or a range of the addresses. The main processor 12 may delegate an access authority to the second storage area 120 to the auxiliary processor 13. The auxiliary processor 13 may directly access the second storage area 120 in the same manner as the accessing of the main memory.

For example, the auxiliary processor 13 may directly use data stored in the second storage area 120, without loading the data on the random access memory 15 (e.g., without first loading the data on the random access memory 15). The auxiliary processor 13 may transmit a write and/or read request for the second storage area 120 directly to the controller 130 through the host controller interface 16, and not through the direct memory access controller DMAC.

As described above, the auxiliary processor 13 may directly access the storage device 100, without loading data on the random access memory 15. Thus, it may be possible to reduce time, resources, and power that may have otherwise been used to load the data on the random access memory 15.

As an example, when the auxiliary processor 13 is configured to execute a machine learning based classification task, data for loading or replacing a classification model (e.g., synapse data of a neural network) may be required by the auxiliary processor 13. Due to an infrequent need for loading and/or replacing the classification model, a large amount of data may be read from the storage device 100 by the auxiliary processor 13 at a low frequency (e.g., infrequently).

This data usage pattern may be suitable for a method in which the auxiliary processor 13 is configured to access the second storage area 120 of the storage device 100 directly and not through the random access memory 15. For example, it may be possible to suppress and/or limit a reduction in operation speed that may occur by not using the random access memory 15, and to provide a reduction in time, resources, and power consumption that can be achieved by not using the random access memory 15.

Figure 2:
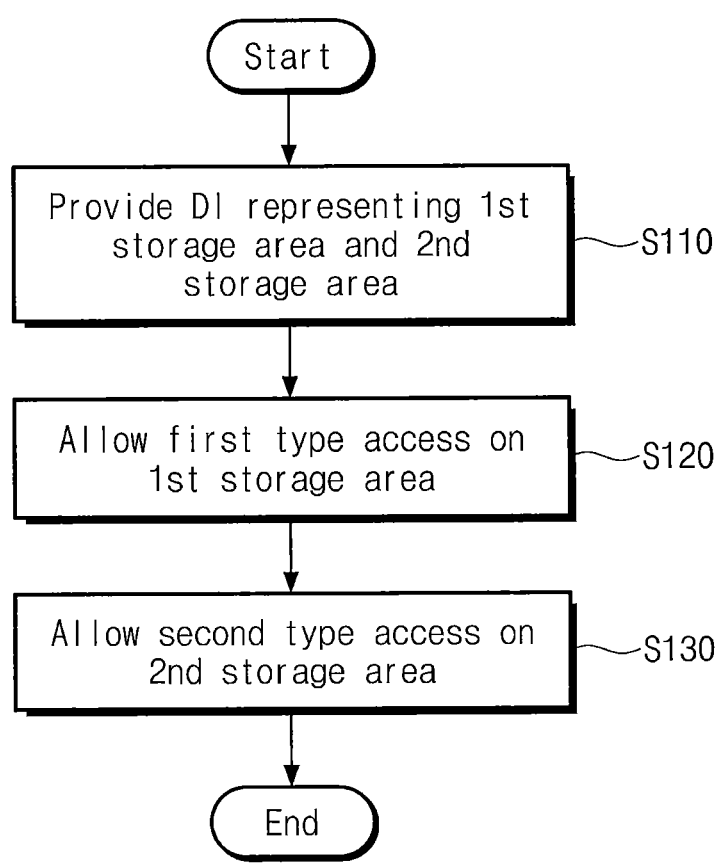
FIG. 2 is a flow chart illustrating a method of operating a storage device according to some embodiments of the inventive concepts.

FIG. 2 is a flow chart illustrating a method of operating the storage device 100 according to some embodiments of the inventive concepts. Referring to FIGS. 1 and 2, in step S110, the controller 130 may provide the device information DI representing availability of the first storage area 110 and the second storage area 120 to an external host device (e.g., the host controller interface 16).

The device information DI may contain information indicating that the storage device 100 includes the first storage area 110, which is a target of the first access type, and the second storage area 120, which is a target of the second access type. The device information DI may contain information on a size (e.g., a capacity) of an accessible area of the first storage area 110 and a size (e.g., a capacity) of an accessible area of the second storage area 120.

Based on the device information DI, the main processor 12 may allocate addresses of the secondary memory to the first storage area 110 and allocate addresses of the main memory to the second storage area 120.

In step S120, the controller 130 may allow a first access type on the first storage area 110. The first access type may be based on an address system of the secondary memory.

In step S130, the controller 130 may allow a second access type in the second storage area 120. The second access type may be based on an address system of the main memory.

Figure 3:
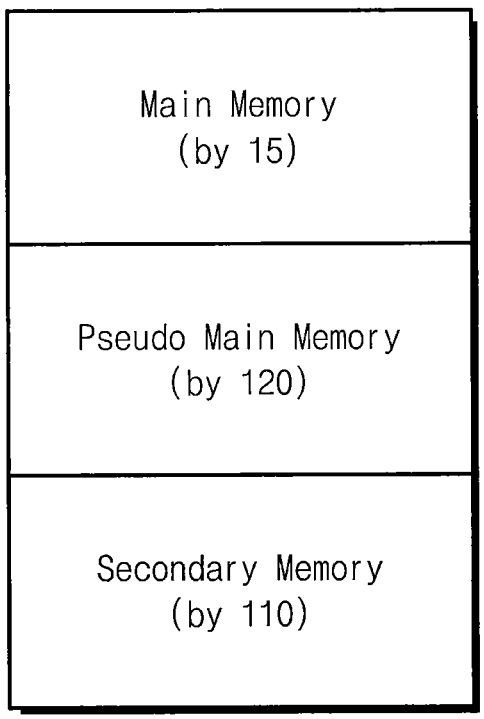
FIG. 3 illustrates an address map of a storage system according to some embodiments of the inventive concepts.

FIG. 3 illustrates an address map of the storage system 10 according to some embodiments of the inventive concepts. Referring to FIGS. 1 and 3, a storage area of the main memory may be generated by the random access memory 15. Addresses (e.g., virtual addresses) may be allocated to a storage area of the random access memory 15. The main processor 12 may access the storage area of the main memory using the virtual addresses.

The memory controller 14 may convert the virtual addresses to physical addresses of the random access memory 15. The memory controller 14 may access the random access memory 15 using the converted physical addresses. In other words, the storage area of the main memory may be identified based on the virtual addresses and the physical addresses.

A storage area of the pseudo main memory may be generated by the second storage area 120 of the storage device 100. Virtual addresses and logical addresses may be allocated to the second storage area 120 of the storage device 100. The main processor 12 and/or the auxiliary processor 13 may access the storage area of the pseudo main memory using the virtual addresses and/or the logical addresses.

The host controller interface 16 may convert virtual addresses, which are included in an access request, to logical addresses of the second storage area 120. The host controller interface 16 may transmit an access request including logical addresses to the controller 130. The controller 130 may convert logical addresses of the second storage area 120 to physical addresses. The controller 130 may access the second storage area 120 using the converted physical addresses. In other words, the storage area of the pseudo main memory may be identified based on the virtual addresses, the logical addresses, and the physical addresses.

A storage area of the secondary memory may be generated by the first storage area 110 of the storage device 100. Logical addresses may be allocated to the first storage area 110 of the storage device 100. The main processor 12 may access the storage area of the pseudo main memory using the logical addresses.

The host controller interface 16 may transmit an access request including the logical addresses of the first storage area 110 to the controller 130. The controller 130 may convert the logical addresses of the first storage area 110 to physical addresses. The controller 130 may access the first storage area 110 using the converted physical addresses. In other words, the storage area of the secondary memory may be identified based on the logical addresses and the physical addresses.

The pseudo main memory may be an address region, which may be used by the auxiliary processor 13 under the delegation of the main processor 12. The pseudo main memory may be configured based on the address system of the main memory. The secondary memory may be configured based on the address system of the secondary memory. In other words, the first and second storage areas 110 and 120 of the storage device 100 may be configured by the main processor 12 to have different address systems.

For example, the address regions of the main memory and the pseudo main memory may be configured in such a way that an access on each of them is executed in the unit (e.g., a unit size) of several bytes. As used herein, "several bytes" refers to accesses that are less than 1 kilobyte (1024 bytes) in length (e.g., 8 bytes). The address region of the secondary memory may be configured in such a way that an access thereon is executed in the unit (e.g., a unit size) of several kilobytes (e.g., 8 kilobytes). As used herein, "several kilobytes" refers to accesses that are greater than 1 kilobyte in length. In some embodiments, the unit size of a memory access may refer to a minimum size of the memory access. For example, a minimum unit that may be addressed in the main memory and the pseudo main memory may have a smaller size (e.g., a smaller unit size) than a minimum unit that may be addressed in the secondary memory.

The main processor 12 may allocate virtual addresses to the first and second storage areas 110 and 120 of the storage device 100, thereby generating address regions of the pseudo main memory and the secondary memory.

An operating system or applications, which may be executed by the main processor 12 and/or the auxiliary processor 13, may request an access on the storage area of the pseudo main memory using the virtual addresses. The host controller interface 16 may convert the virtual addresses to logical addresses of the second storage area 120 of the storage device 100 and may request an access on the second storage area 120 using the converted logical addresses.

The operating system or applications, which are executed by the main processor 12, may request an access on the storage area of the secondary memory using the virtual addresses. The host controller interface 16 may covert the virtual addresses to logical addresses of the first storage area 110 of the storage device 100 and may request an access on the first storage area 110 using the converted logical addresses.

The controller 130 of the storage device 100 may convert the logical addresses to physical addresses of the first storage area 110 or the second storage area 120 and may access the first storage area 110 or the second storage area 120 using the converted physical addresses.

Figure 4:
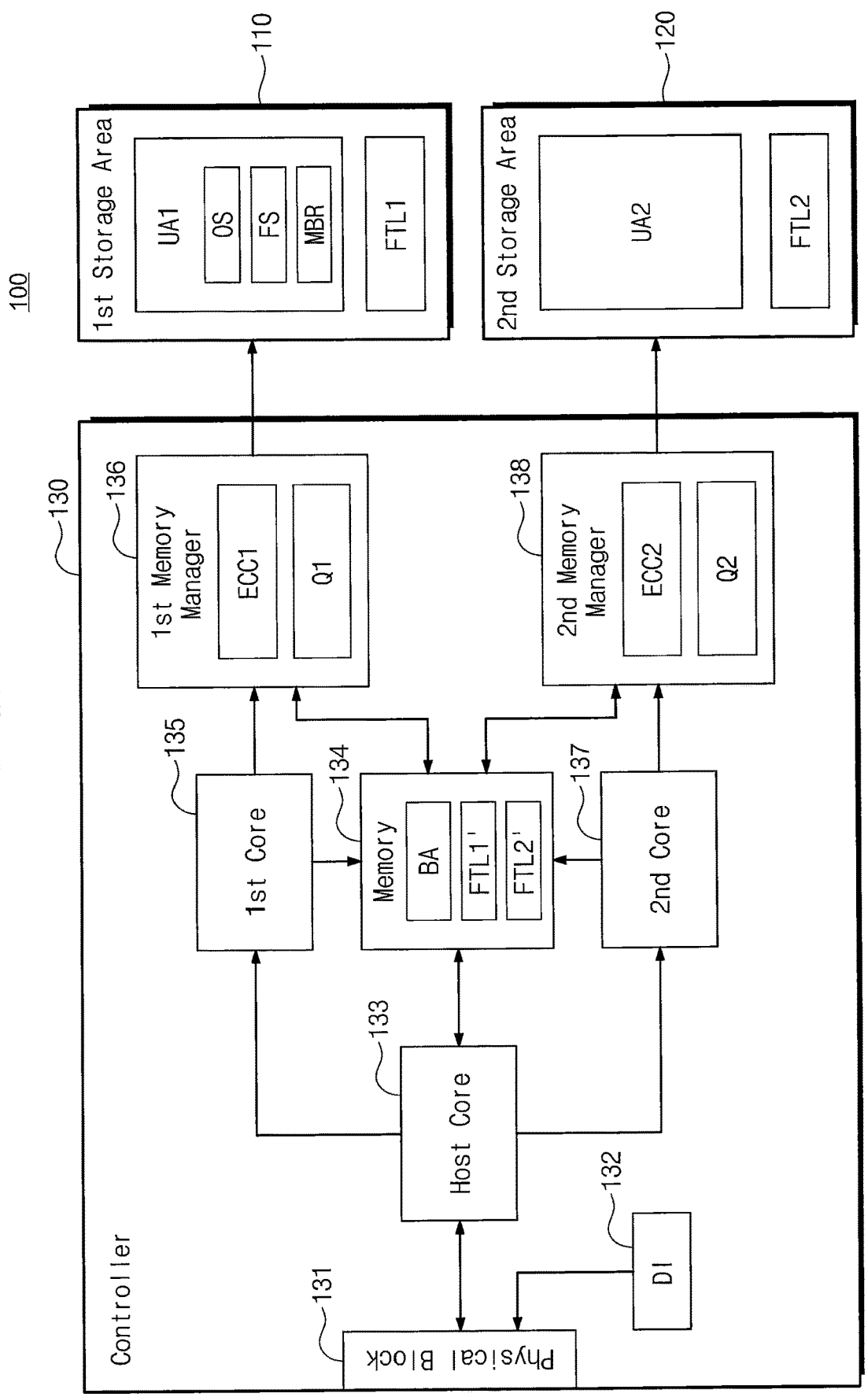
FIG. 4 is a block diagram illustrating a storage device according to some embodiments of the inventive concepts.

FIG. 4 is a block diagram illustrating the storage device 100 according to some embodiments of the inventive concepts. Referring to FIGS. 1 and 4, the storage device 100 may include the first storage area 110, the second storage area 120, and the controller 130.

The first storage area 110 may include a first user region UA1 and a first flash translation layer FTL1. The first user region UA1 may be a storage space that is identified by an external host device (e.g., the host controller interface 16). The operating system OS, the file system FS, and the master boot record MBR may be stored in the first user region UA1.

The first flash translation layer FTL1 may contain information on relationships between logical and/or virtual addresses of a host side of the first user region UA1 and physical addresses of the first user region UA1. In some embodiments, the logical and/or virtual addresses of the host side of the first user region UA1 may be logical and/or virtual addresses as allocated by a user of the first storage area 110 such as the main processor 12 of FIG. 1, and the first flash translation layer FTL1 may maintain, for example, a relationship between a logical and/or virtual address allocated by the main processor 12 and a physical address in the first user region UA1 that is associated with the allocated logical and/or virtual address. The first flash translation layer FTL1 may be stored in a meta storage space, which may not be identified by the host controller interface 16.

The second storage area 120 may include a second user region UA2 and a second flash translation layer FTL2. The second user region UA2 may be a storage space that is identified by an external host device (e.g., the host controller interface 16). The second user region UA2 may be managed independent of the file system FS and/or the first user region UA1.

The second user region UA2 may be directly accessed by the main and/or auxiliary processor 12 or 13, similar to the main memory. The second user region UA2 may not be used to store the data (e.g., the master boot record MBR, the file system FS, the operating system OS) associated with the secondary memory. The second user region UA2 may store data (e.g., various classification models) to be used by the auxiliary processor 13.

The second flash translation layer FTL2 may contain information on relationships between logical and/or virtual addresses of a host side of the second user region UA2 (e.g., logical and/or virtual addresses as allocated by a user of the second user region UA2) and physical addresses of the second user region UA2. The second flash translation layer FTL2 may be stored in a meta storage space, which may not be identified by the host controller interface 16.

The controller 130 may include a physical block 131, a storage 132, a host core 133, a memory 134, a first core 135, a first memory manager 136, a second core 137, and a second memory manager 138.

The physical block 131 may be a physical layer that is used to communicate with the host controller interface 16. During the initialization, the physical block 131 may provide the device information DI stored in the storage 132 to the host controller interface 16. The storage 132 may include a nonvolatile memory (e.g., ROM, EPROM, EEPROM, a FLASH memory, a phase-change memory, a ferroelectric memory, a magnetic memory, or a resistive memory).

The host core 133 may be configured to communicate with the host controller interface 16. The host core 133 may depacketize a packet (e.g., an UFS protocol information unit (UPIU)), which may be received from the host controller interface 16 through the physical block 131, interpret and/or parse information obtained by depacketizing the packet, and/or operate based on the interpreted and/or parsed result.

For example, when a command is transmitted from the host controller interface 16, the host core 133 may transmit the command to the first core 135 or the second core 137. The host core 133 may determine whether to transmit the received packet to the first core 135 corresponding to the first storage area 110 or to the second core 137 corresponding to the second storage area 120, based on a packet received from the host controller interface 16.

When data are transmitted from the host controller interface 16, the host core 133 may store the data in a buffer area BA of the memory 134. When it is necessary to transmit the data to the host controller interface 16, the host core 133 may generate a packet including the data stored in the buffer area BA of the memory 134 and then transmit the generated packet to the host controller interface 16 through the physical block 131.

When it is necessary to transmit a response to the host controller interface 16, the host core 133 may generate a packet, in which information required for the response is contained, and then transmit the generated packet to the host controller interface 16 through the physical block 131.

The host core 133 may include a queue storing commands transmitted from the host controller interface 16. The host core 133 may support a scheduling and/or adjusting of execution schedules of commands registered in the queue based on their priorities.

The memory 134 may include the buffer area BA, the first flash translation layer FTL1', and the second flash translation layer FTL2'. The buffer area BA may temporarily store data, which may be written in the first or second storage area 110 or 120 and/or be read from the first or second storage area 110 or 120.

The first flash translation layer FTL1' may be loaded from the first storage area 110, during the initialization and/or when the need arises. The first flash translation layer FTL1' may be backed up in the first storage area 110, when the power is interrupted and/or the need arises.

The second flash translation layer FTL2' may be loaded from the second storage area 120, during the initialization or when the need arises. The second flash translation layer FTL2' may be backed up in the first storage area 110, when the power is interrupted or the need arises.

The first flash translation layer FTL1' and the second flash translation layer FTL2' may be stored in a system area of the memory 134. For example, the buffer area BA and the system area of the memory 134 may be separated from each other. In some embodiments, the memory 134 may be placed outside the controller 130. In some embodiments, the memory 134 may be divided into two or more memories, at least one of which is placed outside the controller 130.

The first core 135 may convert an address, which may be included in a command transmitted from the host core 133, to a physical address of the first user region UA1 of the first storage area 110 using the first flash translation layer FTL1' of the memory 134. The first core 135 may transmit the command and the physical address to the first memory manager 136.

The first memory manager 136 may store a command and/or an address transmitted from the first core 135 in a first queue Q1. The first memory manager 136 may sequentially execute commands stored in the first queue Q1. When instructing a write operation on the first storage area 110, the first memory manager 136 may transmit a write command and an address to the first storage area 110.

In addition, the first memory manager 136 may read data from the buffer area BA of the memory 134. The first memory manager 136 may execute an error correction encoding on data read from the buffer area BA using a first error correction code ECC1, thereby adding an error correction parity to the data. The first memory manager 136 may transmit the data with the error correction parity to the first storage area.

When instructing a read operation on the first storage area 110, the first memory manager 136 may transmit a read command and an address to the first storage area 110. The first memory manager 136 may execute an error correction decoding on data and a parity, which may be transmitted from the first storage area 110, thereby detecting and correcting an error. The first memory manager 136 may store the data to which the error correction decoding is executed in the buffer area BA of the memory 134.

The second core 137 may convert an address, which may be included in a command transmitted from the host core 133, to a physical address of the second user region UA2 of the second storage area 120 using the second flash translation layer FTL2' of the memory 134. The second core 137 may transmit the command and the physical address to the second memory manager 138.

The second memory manager 138 may store the command and/or the address transmitted from the second core 137 in a second queue Q2. The second memory manager 138 may sequentially execute commands stored in the second queue Q2. Similar to that described with reference to the first memory manager 136, the second memory manager 138 may instruct a write and/or read operation on the second storage area 120.

Similar to that described with reference to the first memory manager 136, the second memory manager 138 may execute an error correction encoding and/or an error correction decoding, using a second error correction code ECC2. The second memory manager 138 may transmit data from the memory 134 to the second storage area 120 and/or may store data from the second storage area 120 in the memory 134.

In some embodiments, the first core 135 may convert an address based on an address system of the secondary memory to a physical address of the first storage area 110. A unit size of an address conversion may be several kilobytes. The second core 137 may convert an address based on the address system of the main memory to a physical address of the second storage area 120. A unit size of the address conversion may be several bytes.

It has been described with respect to FIG. 4 that the first and second cores 135 and 137, which are respectively associated with the first and second storage areas 110 and 120, are separated from each other. However, the address conversion of the first storage area 110 and the address conversion of the second storage area 120 may be executed by one core.

Similarly, it has been described with respect to FIG. 4 that the first and second memory managers 136 and 138, which are respectively associated with the first and second storage areas 110 and 120, are separated from each other. However, the first and second storage areas 110 and 120 may be accessed by one memory manager.

FIG. 5 illustrates an example of a command UPIU associated with the first storage area 110. Referring to FIGS. 4 and 5, the command UPIU may include zeroth to thirty-first bytes B0-B31. The zeroth byte B0 may indicate a transaction type and may have a value determined according to UFS standards.

The first byte B1 may indicate flags and may have a value determined according to the UFS standards. The second byte B2 may indicate a logical unit number LUN and may have a value determined according to the UFS standards. The third byte B3 may indicate a task tag and may have a value determined according to the UFS standards. The fourth byte B4 may indicate an initiator ID IID and a command set type CST and may have a value determined according to the UFS standards.

The fifth to seventh bytes B5-B7 may be reserved. The eighth byte B8 may indicate an extra header segment (EHS) length and may have a value determined according to the UFS standards. The ninth byte B9 may be reserved. The tenth and eleventh bytes B10 and B11 may indicate a data segment length and may have values determined according to the UFS standards.

The twelfth to fifteenth bytes B12-B15 may indicate an expected data transfer length and may have a value determined according to the UFS standards. The sixteenth to thirty-first bytes B16-B31 may indicate a command description block CDB and may have values determined according to the UFS standards.

FIG. 6 illustrates an example of a command UPIU associated with the second storage area 120. Referring to FIGS. 4 and 6, the zeroth to third bytes B0-B3 may be the same as the zeroth to third bytes B0-B3 of FIG. 5. The fourth byte B4 may include an initiator ID IID and a constant value '01h'. The '01h' value may indicate that the UPIU concerned is not managed by the file system FS and is associated with the second storage area 120 allocated as the pseudo main memory.

The fifth byte B5 may indicate the logical unit number LUN managed by the file system FS. For example, the fifth byte B5 may indicate a logical unit number LUN of the first storage area 110. Sixth and seventh bytes B6 and B7 may be reserved, as in FIG. 5.

The eighth to eleventh bytes B8-B11 may indicate a logical block address. For example, the logical block address may be an address, which is used when the main processor 12 (e.g., see FIG. 1) allocates the second storage area 120 and/or when the main or auxiliary processor 12 or 13 accesses the second storage area 120. The twelfth to fifteenth bytes B12-B15 may indicate an expected transfer length. The sixteenth byte B16 may indicate an operation code Opcode. The seventeenth to thirty-first bytes B17-B31 may be reserved.

As described with reference to FIGS. 5 and 6, the host controller interface 16 may insert additional information, which indicates whether the UPIU transmitted to the storage device 100 is directed toward the first storage area 110 or toward the second storage area 120, in the UPIU transmitted to the storage device 100. The host core 133 of the controller 130 may quickly determine whether the UPIU concerned is directed toward the first storage area 110 or the second storage area 120, based on the information inserted in the UPIU.

Figure 7:
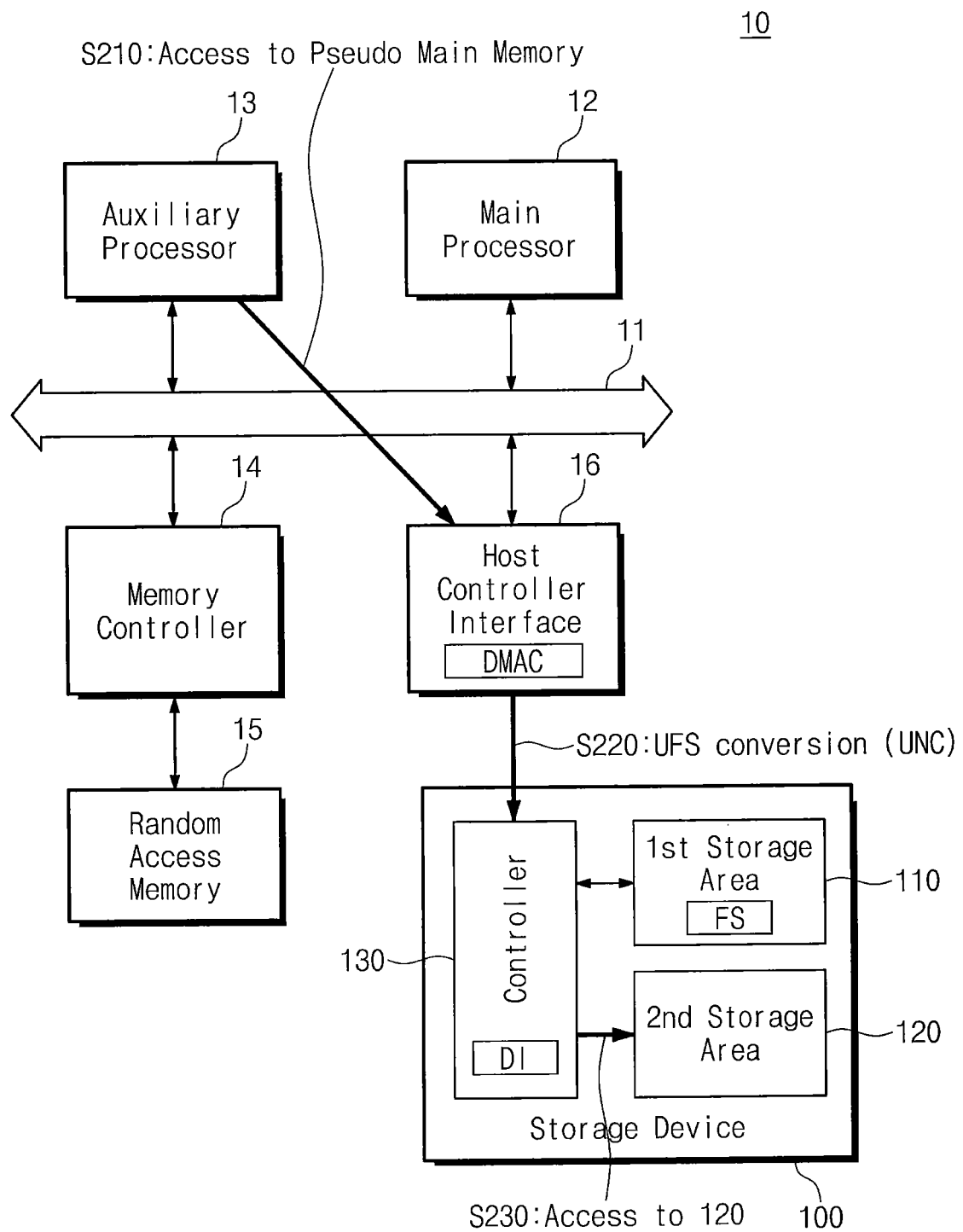
FIG. 7 illustrates an example in which an auxiliary processor accesses a second storage area, according to some embodiments of the inventive concepts.

FIG. 7 illustrates an example in which the auxiliary processor 13 accesses the second storage area 120, according to some embodiments of the inventive concepts. Referring to FIG. 7, the auxiliary processor 13 may receive addresses allocated to the second storage area 120 from the main processor 12. The auxiliary processor 13 may identify the second storage area 120 as the main memory.

In step S210, the auxiliary processor 13 may transmit a write or read request on the second storage area 120 (i.e., the pseudo main memory) to the host controller interface 16, using the allocated addresses. For example, the auxiliary processor 13 may transmit a write or read request, which has a data size of several bytes, to the host controller interface 16.

In step S220, the host controller interface 16 may convert the request transmitted from the auxiliary processor 13 to a UPIU described with reference to FIG. 6. For example, the converted UPIU may be an UFS native command (UNC). The UPIU may include a write or read command associated with data of a unit of several bytes, which is requested by the auxiliary processor 13. The host controller interface 16 may transmit the generated UPIU to the controller 130.

If the UPIU is received, the controller 130 may access the second storage area 120, in step S230. For example, when the received UPIU includes a write command, the controller 130 may transmit a ready to transfer (RUT) UPIU to the host controller interface 16. The host controller interface 16 may transmit a data output UPIU including write data to the controller 130.

The controller 130 may write the received write data in the second storage area 120. If the writing is finished, the controller 130 may transmit a response UPIU to the host controller interface 16.

When a UPIU received by the controller 130 includes a read command, the controller 130 may read data from the second storage area 120. The controller 130 may transmit a data input UPIU including the read data to the host controller interface 16. The controller 130 may transmit a response UPIU to the host controller interface 16, thereby informing the host controller interface 16 that the data transmission has been finished.

In some embodiments, the auxiliary processor 13 may access the second storage area 120, based on the address system of the main memory. The auxiliary processor 13 may request a write or read operation associated with data of a unit of several bytes, to the host controller interface 16. Thus, when the auxiliary processor 13 accesses the second storage area 120, one command UPIU may be accompanied with one data input or data output UPIU.

Figure 8:
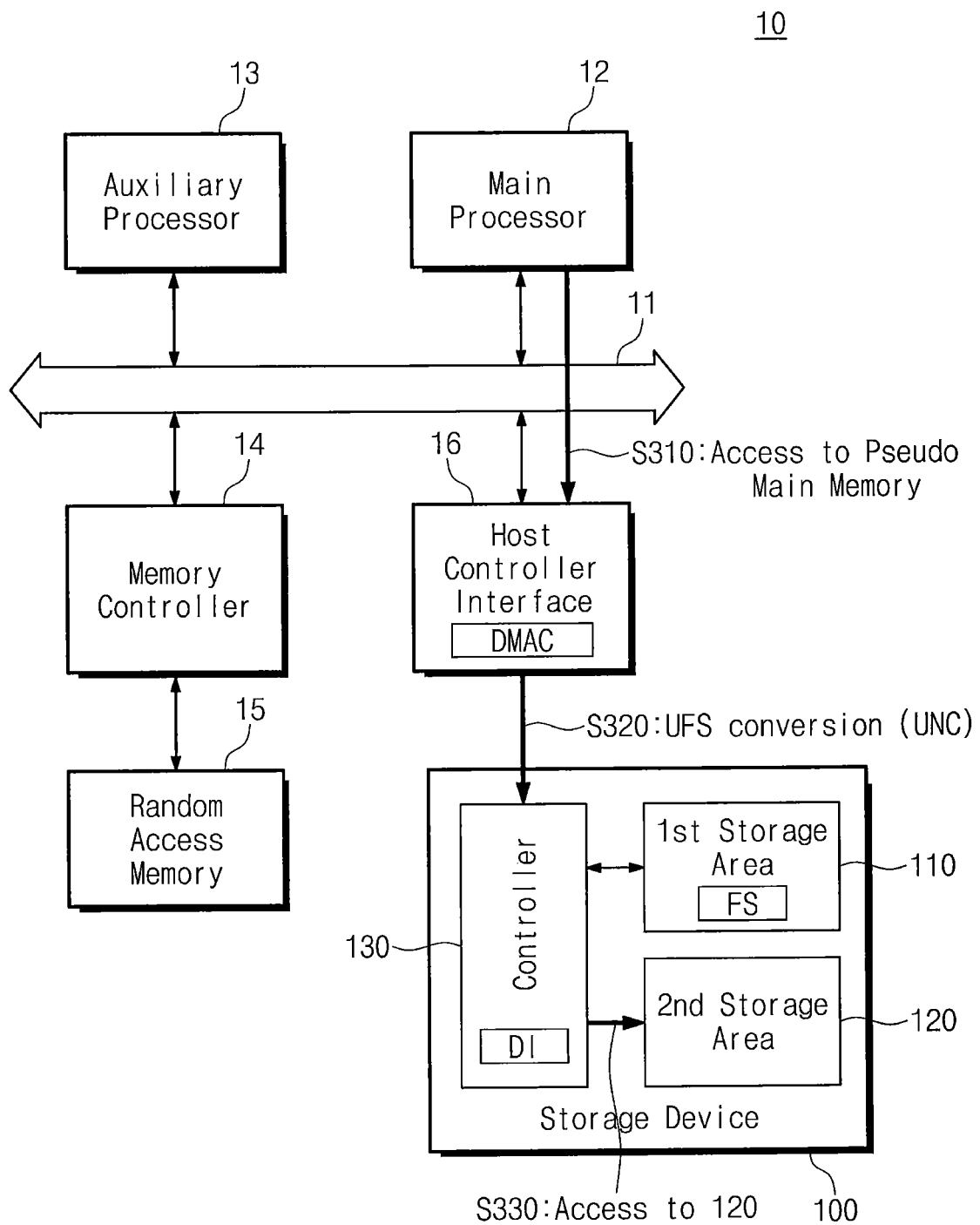
FIG. 8 illustrates an example in which a main processor accesses a second storage area, according to some embodiments of the inventive concepts.

FIG. 8 illustrates an example in which the main processor 12 accesses the second storage area 120, according to some embodiments of the inventive concepts. For example, when the auxiliary processor 13 (or other peripheral devices) requests a write operation of a specific data for the second storage area 120 to the main processor 12, the main processor 12 may write the requested data in the second storage area 120. When the auxiliary processor 13 (or other peripheral devices) requests a read operation of a specific data for the second storage area 120 to the main processor 12, the main processor 12 may read the requested data from the second storage area 120.

Referring to FIG. 8, in step S310, the main processor 12 may transmit a write or read request on the second storage area 120 (i.e., the pseudo main memory) to the host controller interface 16 using allocated addresses. For example, the main processor 12 may transmit a write or read request associated with data of a unit of several bytes to the host controller interface 16.

In step S320, the host controller interface 16 may convert the write or read request to a UPIU. The step S320 may be executed in the same manner as the step S220. In step S330, the controller 130 may access the second storage area 120. The step S330 may be executed in the same manner as the step S230.

That is, regardless of whether the second storage area 120 is accessed by the main or auxiliary processor 12 or 13, the storage device 100 may access the second storage area 120 in the same manner. Depending on whether the second storage area 120 is accessed by the main or auxiliary processor 12 or 13, the host controller interface 16 may make a difference in a destination of a response or data to be transmitted.

Figure 9:
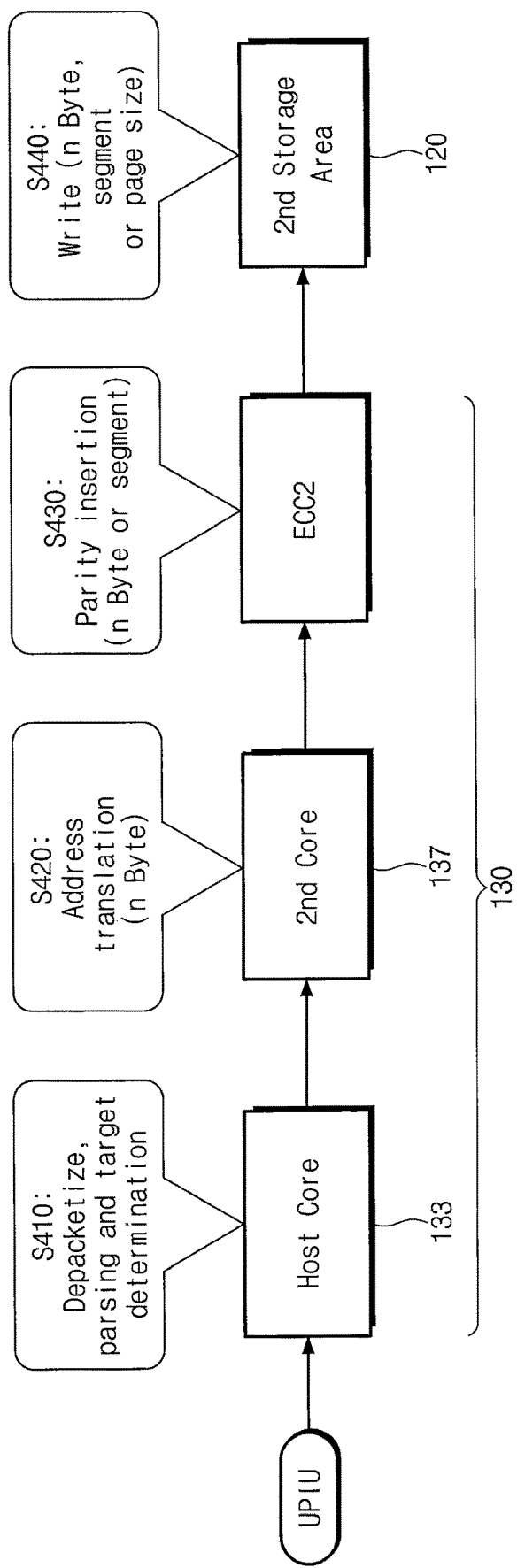
FIG. 9 illustrates an example in which a storage device according to some embodiments of the inventive concepts writes data in a second storage area.

FIG. 9 illustrates an example in which the storage device 100, according to some embodiments of the inventive concepts, writes data in the second storage area 120. Referring to FIGS. 1, 4, and 9, the controller 130 may receive a UPIU from the host controller interface 16. For example, the controller 130 may receive a command UPIU requesting a write operation and a data output UPIU including data.

In step S410, the host core 133 of the controller 130 may depacketize the UPIU, parse the depacketized UPIU, and determine which of the first and second storage areas 110 and 120 is associated with the data. For example, the host core 133 may determine that the second storage area 120 is the target of the write operation.

In step S420, the second core 137 of the controller 130 may execute an address conversion. For example, the command UPIU may include an address (e.g., a logical or virtual address) of the second storage area 120, in which the data will be written. The second core 137 may convert the address included in the command UPIU to a physical address of the second storage area 120. A unit size of the address conversion may be n bytes, where n is a positive integer.

In step S430, the second error correction code ECC2 of the controller 130 may execute an error correction encoding of inserting error correction parity. A unit size of the error correction encoding may be n bytes that is equal to the unit size of an access of the auxiliary processor 13 or the main processor 12 or unit size of the address conversion of the second core 137. In other words, the second error correction code ECC2 may insert the error correction parity whenever data of n bytes are written in the second storage area 120.

In certain embodiments, the unit size of the error correction encoding may be a segment. A size of the segment may be smaller or larger than the unit size of the access of the auxiliary processor 13 or the main processor 12. However, the inventive concepts are not limited to a specific size of a unit size of the error correction encoding.

In step S440, the second memory manager 138 of the controller 130 may instruct a write operation on the second storage area 120. A unit size of the write operation may be the n bytes, the segment, or the page. The page may be a size of unit data processed in the read and write operations on the second storage area 120. The size of the page may be larger than the n bytes and the size of the segment.

The read operation may be executed in the similar manner to the write operation described with reference to FIG. 9. For example, the second core 137 may execute the address conversion, the controller 130 may read data from the second storage area 120, and then, the second error correction code ECC2 may execute the error correction decoding. The controller 130 may transmit data, on which the error correction is executed, to the host controller interface 16.

Figure 10:
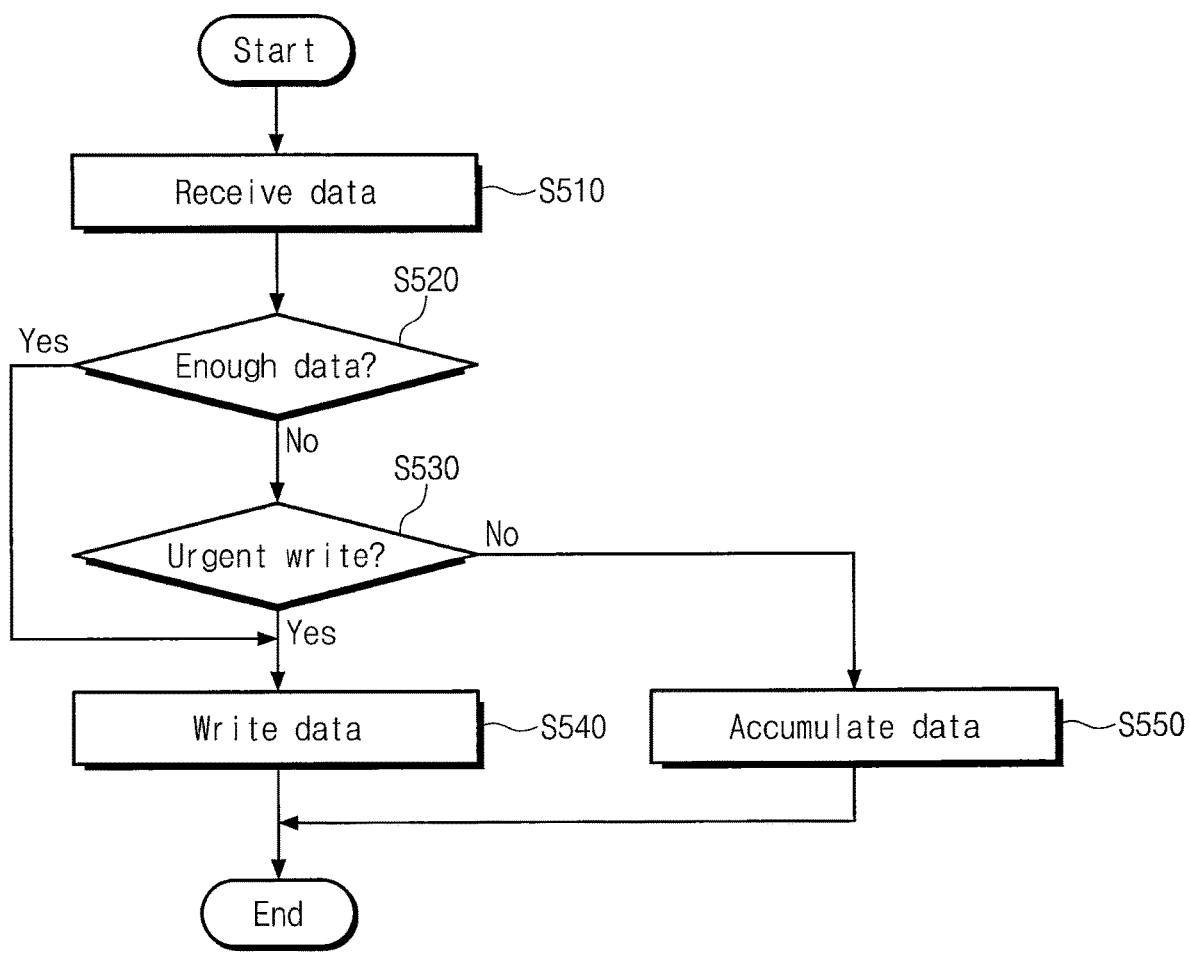
FIG. 10 is a flow chart illustrating an example in which a controller writes data in a second storage area, according to some embodiments of the inventive concepts.

FIG. 10 is a flow chart illustrating an example in which the controller 130 writes data in the second storage area 120, according to some embodiments of the inventive concepts. Referring to FIGS. 1, 4, and 10, in step S510, the controller 130 may receive data from the host controller interface 16. The controller 130 may store the received data in the buffer area BA of the memory 134.

In step S520, the controller 130 may determine whether enough data are received. The criterion for the determination may be, for example, the page, which is a unit size of the read or write operation of the second storage area 120. When a size of data stored in the buffer area BA (e.g., a size of data to be written in the second storage area 120) is equal to or larger than the size of the page, the controller 130 may determine that enough data are received.

If enough data are received, the controller 130 may write the data (e.g., corresponding to the unit size of the read or write operation) in the second storage area 120, in step S540. Thereafter, the write operation of the data may be terminated. If received data are not enough, step S530 may be performed. In the step S530, the controller 130 may determine whether there is a need of an urgent write.

As an example, when a sudden power off (SPO) is required, it may be determined that the urgent write is needed. As another example, when guaranteed write of the received data to the second storage area 120 is required (e.g., a write through is required), it may be determined that the urgent write is needed.

When the urgent write is needed, the controller 130 may write the data, which are stored in the buffer area BA, in the second storage area 120, even though data stored in the buffer area BA is smaller than the size of the page, in step S540. If the urgent write is not needed, the controller 130 may accumulate the received data, in step S550.

For example, if the data are written in the buffer area BA, the controller 130 may terminate the write operation of the data. If other data are further received to form enough accumulated data, the controller 130 may write the accumulated data in the second storage area 120.

Conventionally, one page of a nonvolatile memory device (e.g., FLASH memory device) may have a size of several kilobytes or larger. Once data are written in one page, an additional data writing on the page may be prohibited, even when there is an unwritten storage space in the same page.

That is, when the main or auxiliary processor 12 or 13 requests that data are written in the second storage area 120 in a unit of several bytes, the requests may be executed immediately in a unit of several bytes. When the requests are executed immediately in a unit of several bytes, a storage space, which is not completely written but is prohibited from being written, may be created in the second storage area 120.

According to some embodiments of the inventive concepts, when there is no need of an urgent write, the controller 130 may accumulate data by a specific data size (e.g., the size of the page) and may write the accumulated data in the second storage area 120. Thus, it may be possible to prevent the storage space of the second storage area 120 from being discarded.

Figure 11:
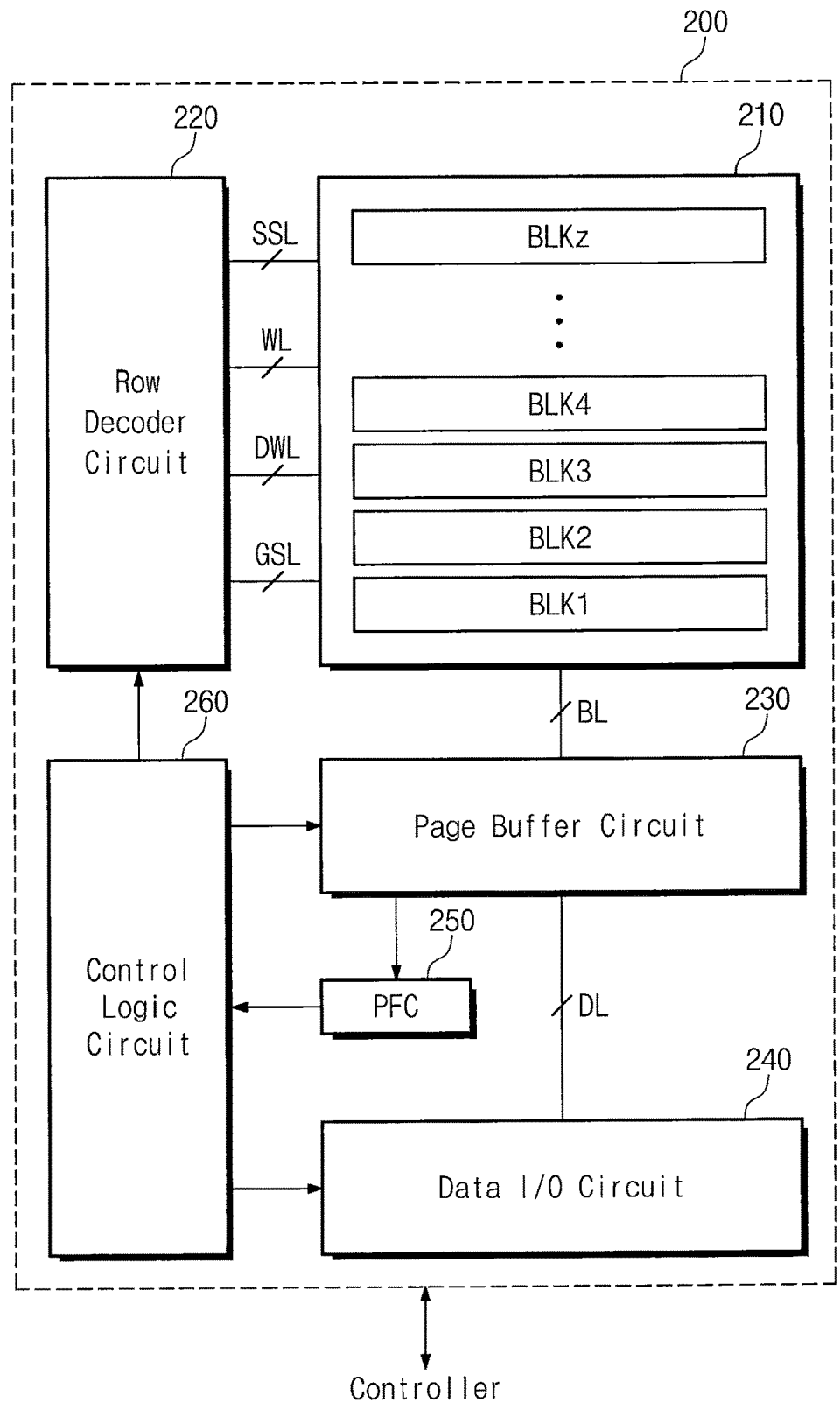
FIG. 11 is a block diagram illustrating a nonvolatile memory device, which is implemented with a first storage area or a second storage area, according to some embodiments of the inventive concepts.

FIG. 11 is a block diagram illustrating a nonvolatile memory device 200, which is implemented with the first storage area 110 or second storage area 120, according to some embodiments of the inventive concepts. Referring to FIGS. 4 and 11, the nonvolatile memory device 200 may include a memory cell array 210, a row decoder circuit 220, a page buffer circuit 230, a data input/output circuit 240, a pass-fail check circuit 250, and a control logic circuit 260.

The memory cell array 210 may include a plurality of memory blocks BLK1-BLKz. Each memory block may include a plurality of memory cells. Each memory block may be connected to the row decoder circuit 220 through at least one ground selection line GSL, dummy word lines DWL, word lines WL, and at least one string selection line SSL.

Each memory block may be connected to the page buffer circuit 230 through a plurality of bit lines BL. The memory blocks BLK1-BLKz may be connected in common to the bit lines BL. The memory cells of the memory blocks BLK1-BLKz may have substantially the same structure.

In some embodiments, each of the memory blocks BLK1-BLKz may be unit data processed in an erase operation. The memory cells of the memory cell array 210 may be erased for each memory block. The memory cells included in each memory block may be simultaneously erased. In certain embodiments, each memory block may be divided into a plurality of sub-blocks. In this case, each of the sub-blocks may be unit data processed in the erase operation.

In some embodiments, each of the memory blocks BLK1 to BLKz may include a physical storage space which is identified by a block address. Each of the word lines WL may correspond to a physical storage space that is identified by a row address. Each of the bit lines BL may correspond to a physical storage space that is identified by a column address.

In some embodiments, each memory block may include a plurality of physical pages, and each physical page may include a plurality of memory cells. Each physical page may be unit data processed in the program operation. The memory cells in each physical page may be simultaneously programmed. Each physical page may include a plurality of logical pages.

Bits, which are respectively programmed in the memory cells of each physical page may constitute logical pages, may constitute logical pages. First bits, which are programmed in the memory cells of each physical page, may constitute a first logical page. Similarly, K-th bits, which are programmed in the memory cells of each physical page, may constitute a K-th logical page, where K is a positive integer.

The row decoder circuit 220 may be connected to the memory cell array 210 through a plurality of the ground selection lines GSL, a plurality of the dummy word lines DWL, a plurality of the word lines WL, and a plurality of the string selection lines SSL. The row decoder circuit 220 may operate under control of the control logic circuit 260.

The row decoder circuit 220 may decode an address received from the controller 130 through a first channel (e.g., an input/output channel) and may control voltages to be applied to the string selection lines SSL, the dummy word lines DWL, the word lines WL, and the ground selection lines GSL depending on the decoded address.

For example, in a write operation, the row decoder circuit 220 may apply a program voltage to a word line of a memory block selected by an address and may apply a pass voltage to unselected word lines of the selected memory block. The row decoder circuit 220 may apply a turn-off voltage to the ground selection line GSL of the selected memory block and may apply a turn-on voltage to the dummy word lines DWL and the string selection lines SSL.

In a read operation, the row decoder circuit 220 may apply a selection read voltage to a word line of a memory block selected by an address and may apply a non-selection read voltage to unselected word lines of the selected memory block. The row decoder circuit 220 may apply a turn-on voltage to the ground selection line GSL, the dummy word lines DWL, and the string selection lines SSL of the selected memory block.

In an erase operation, the row decoder circuit 220 may apply erase voltages (e.g., a ground voltage or low voltages close to the ground voltage) to word lines of a memory block selected by an address. The row decoder circuit 220 may allow the ground selection line GSL, the dummy word lines DWL, and the string selection lines SSL of the selected memory block to be in a floating state.

The page buffer circuit 230 may be connected to the memory cell array 210 through a plurality of the bit lines BL. The page buffer circuit 230 may be connected to the data input/output circuit 240 through a plurality of data lines DL. The page buffer circuit 230 may operate under control of the control logic circuit 260.

In the write operation, the page buffer circuit 230 may store data to be written in the memory cells. The page buffer circuit 230 may apply voltages, which are respectively determined based on the stored data, to the plurality of bit lines BL. In the read operation or a verification read operation associated with the write or erase operation, the page buffer circuit 230 may sense voltages of the bit lines BL and may store a result of the sensing operation.

The data input/output circuit 240 may be connected to the page buffer circuit 230 through the data lines DL. The data input/output circuit 240 may output data, which are read by the page buffer circuit 230, to the controller 130 through an input/output channel, and may transmit data, which are received from the controller 130 through the input/output channel, to the page buffer circuit 230.

After the verification read operation associated with the write or erase operation, the pass-fail check circuit 250 may receive the sensing result from the page buffer circuit 230. The pass-fail check circuit 250 may determine whether the write or erase operation is passed or failed, based on the received sensing result.

For example, in the verification read operation associated with the write operation, the page buffer circuit 230 may count the number of on-cells that are turned on. If the number of the on-cells is not smaller than a threshold value, the pass-fail check circuit 250 may determine that the write operation is failed. If the number of the on-cells is smaller than the threshold value, the pass-fail check circuit 250 may determine that the write operation is passed.

For example, in the verification read operation associated with the erase operation, the page buffer circuit 230 may count the number of off-cells that are turned off. If the number of the off-cells is not smaller than a threshold value, the pass-fail check circuit 250 may determine that the erase operation is failed. If the number of the on-cells is smaller than the threshold value, the pass-fail check circuit 250 may determine that the erase operation is passed. A result of the pass or fail determination may be provided to the control logic circuit 260.

The control logic circuit 260 may receive a command from the controller 130 through the first channel and may receive a control signal from the controller 130 through a second channel (e.g., a control channel). The control logic circuit 260 may receive the command input through the first channel, may route an address received through the first channel to the row decoder circuit 220, and may route data received through the first channel to the data input/output circuit 240, in response to the control signal.

The control logic circuit 260 may decode the received command and may control the nonvolatile memory device 200 according to the decoded command. In the verification read operation associated with the write or erase operation, the control logic circuit 260 may receive the determination result (e.g., on whether the write or erase operation is passed or failed) from the pass-fail check circuit 250.

Figure 12:
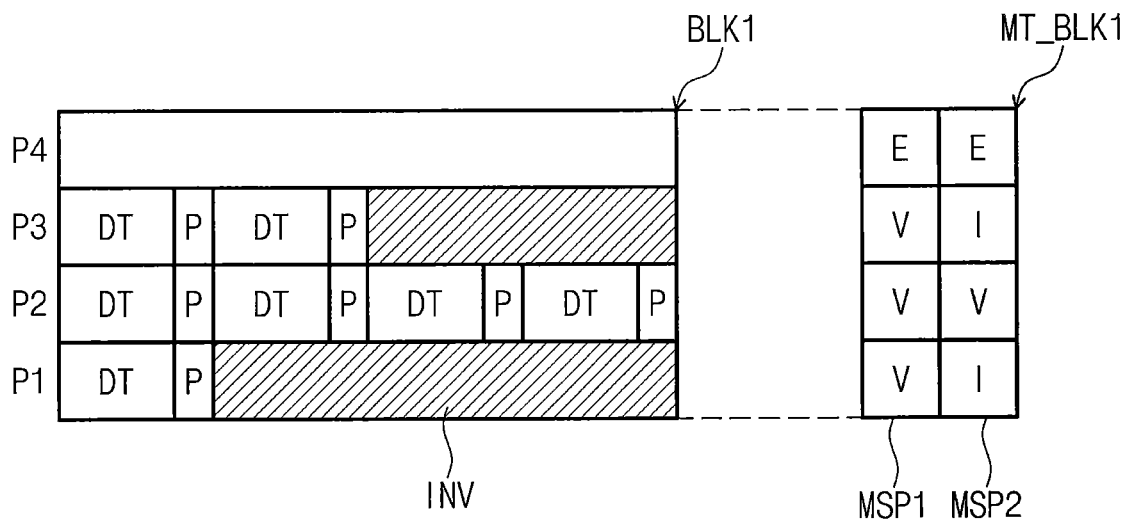
FIG. 12 illustrates an example of a write operation in a first memory block of a memory cell array using the method of FIG. 10.

FIG. 12 illustrates an example of a write operation in the first memory block BLK1 of the memory cell array 210 using the method of FIG. 10. Referring to FIGS. 1, 4, 11, and 12, an urgent write may be executed on a first page P1. For example, one pair of data DT and parity P may be written in the first page P1. The remaining storage space of the first page P1 may be in an invalid state INV.

A size of the data DT may be a unit size when the main or auxiliary processor 12 or 13 accesses the main memory. Data associated with one write request from the main or auxiliary processor 12 or 13 may be written in the first page P1.

In some embodiments, the controller 130 may manage two or more components of meta information on each page of the first memory block BLK1. For example, a first sub-page information MSP1 may indicate whether there are valid data in half (e.g., a first sub-page) of each page. A second sub-page information MSP2 may indicate whether there are valid data in a remaining half (e.g., a second sub-page) of each page.

The first sub-page information MSP1 and second sub-page information MSP2 in first to fourth pages P1-P4 may constitute a first memory block meta information MT_BLK1. When there is valid data in only half (e.g., the first sub-page) of the first page P1, the first sub-page information MSP1 of the first page P1 may include valid information V and the second sub-page information MSP2 may include invalid information I.

A writing of accumulated data may be executed on the second page P2 of the first memory block BLK1. For example, four pairs of data DT and parity P may be written in the second page P2. The first sub-page information MSP1 of the second page P2 may include the valid information V, and the second sub-page information MSP2 may include the valid information V.

After some data are accumulated, an urgent write may be executed on the third page P3 of the first memory block BLK1. For example, two pairs of data DT and parity P may be written in the third page P3. The first sub-page information MSP1 of the third page P3 may include the valid information V, and the second sub-page information MSP2 may include the invalid information I.

The fourth page P4 of the first memory block BLK1 may be a free page, in which data are not written yet. The first sub-page information MSP1 of the fourth page P4 may include free information E, and the second sub-page information MSP2 may include the free information E.

A flash memory device may have an operation property of erase-before-write. According to the erase-before-write operation property, to write data in a specific storage space of the flash memory device, the storage space should be erased in advance. The erase operation of the flash memory device may be executed for each memory block or each sub-block.

To reduce the iteration number of the erase operation, when it is necessary to update specific data written in a specific page of the flash memory device, the controller 130 may write the updated data in another page of the flash memory device and treat the specific page as an invalid page. If the invalid pages are accumulated in a specific memory block, the controller 130 may write valid data of the specific memory block in another memory block and then may execute an erase operation on the specific memory block.

The second storage area 120 may be implemented with a flash memory device. Here, a write request on the flash memory device may be received in a unit size of several bytes. In other words, the updating on data written in the FLASH memory device may be executed in a unit size of several bytes.

Since the size of the page is several kilobytes, each page may store data that are several thousand times the unit size of the access of the main or auxiliary processor 12 or 13. In other words, the pair of data DT and parity P described with reference to FIG. 12 may be written in thousands in each page.

In the case where the controller 130 executes the data updating in the unit of one page, even when one of the pairs of data DT and parity P is updated, the controller 130 should write all of the pairs of data DT and parity P, which are stored in the page concerned, in another page. In other words, the page updating may occur excessively.

By contrast, according to some embodiments of the inventive concepts, the controller 130 may execute the page updating in the unit of a sub-page. When the data updating is required for a specific pair of data DT and parity P, the controller 130 may read a sub-page, in which the specific pair of data DT and parity P is included, and may execute an error correction operation thereon.

The controller 130 may store the error corrected data in the buffer area BA of the memory 134. The controller 130 may update data stored in the buffer area BA, using update data from the main or auxiliary processor 12 or 13. The updated data may be immediately written in the second storage area 120, when the urgent write is needed. In certain embodiments, the updated data, along with other data, may be accumulated and then may be written in the second storage area 120.

Figure 13:
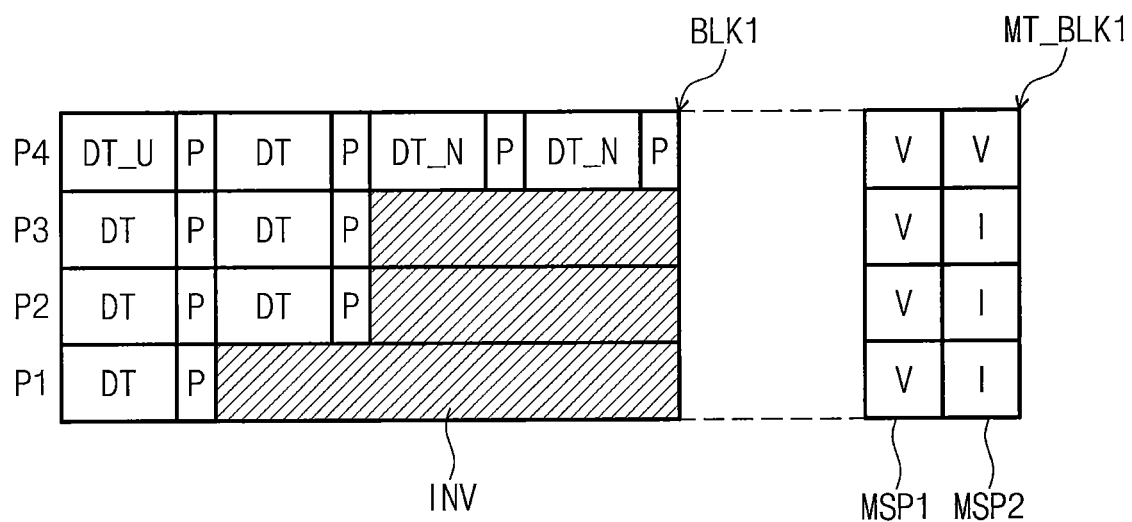
FIG. 13 illustrates an example of updating data which occurs in pages of FIG. 12.

FIG. 13 illustrates an example of updating data which occurs in pages of FIG. 12. Referring to FIGS. 4 and 13, the controller 130 may read pairs of data DT and parity P from the remaining half (e.g., a second sub-page) of the second page P2. The second sub-page information MSP2 of the second page P2 may be updated to include invalid information I.

The controller 130 may update data of the first pair among the read pairs of data DT and parity P to updated data DT_U and parity P. The controller 130 may write pairs of the updated data DT_U and parity P, the data DT and parity P, and new data DT_N and parity P, in the fourth page P4. The first sub-page information MSP1 of the fourth page P4 may include valid information V, and the second sub-page information MSP2 may include valid information V.

As described above, the controller 130 may execute the data updating in the unit of a sub-page. Thus, it may be possible to prevent the page updating from occurring excessively. It has been described in FIGS. 12 and 13 that one page is divided into two sub-pages. However, the inventive concepts are not limited to the number of sub-pages constituting each page.

Figure 14:
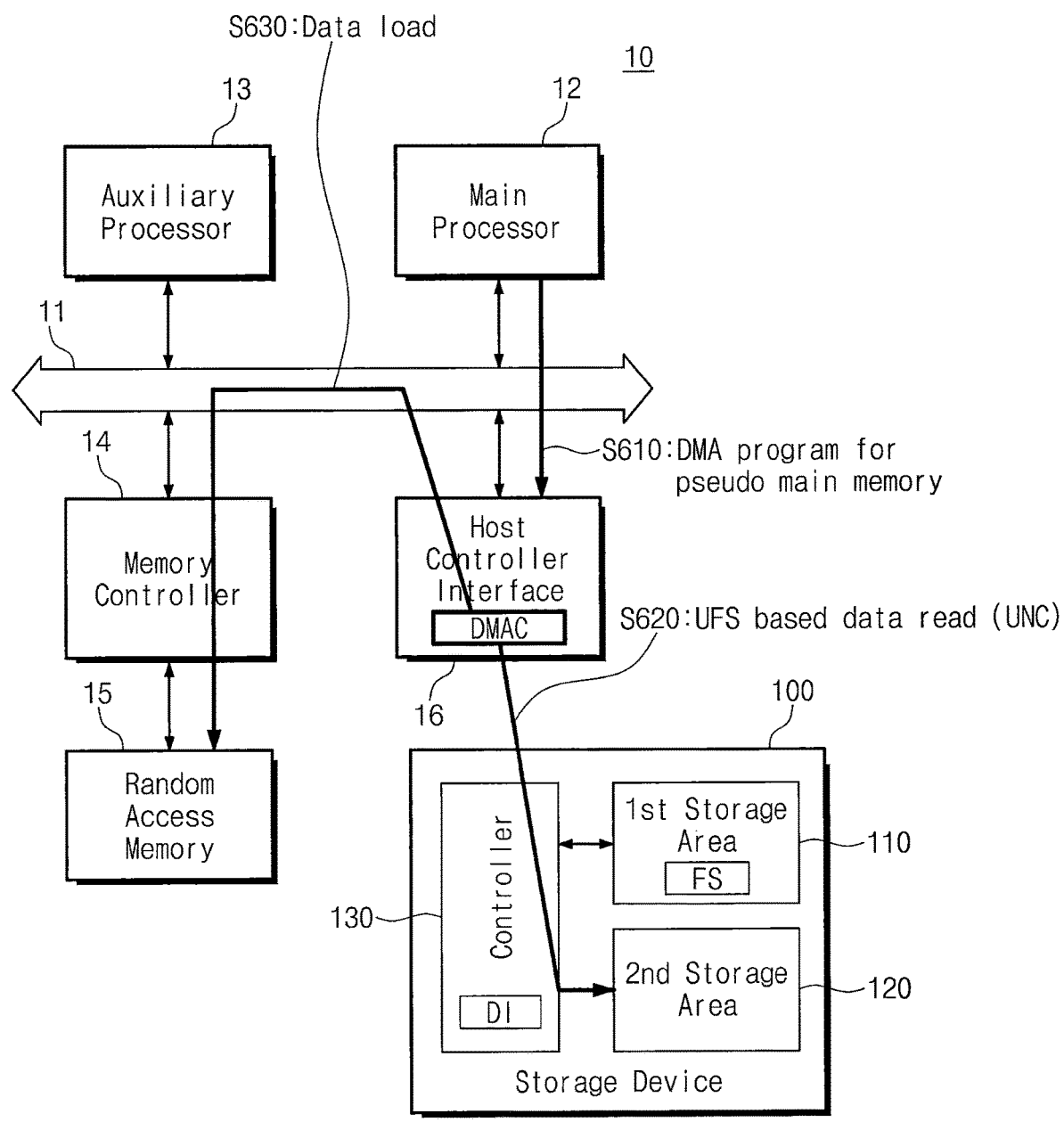
FIG. 14 illustrates an example in which a main processor loads data in a second storage area on a random access memory.

FIG. 14 illustrates an example in which the main processor 12 loads data in the second storage area 120 on the random access memory 15. In some embodiments, when the main processor 12 intends to access data stored in the second storage area 120, the main processor 12 may load the data stored in the second storage area 120 on the random access memory 15.

In certain embodiments, when a high-speed operation of the auxiliary processor 13 is required, the auxiliary processor 13 may require associated data from the main processor 12. Then, the main processor 12 may load the associated data stored in the second storage area 120 on the random access memory 15, in response to the request of the auxiliary processor 13.

Referring to FIG. 14, the main processor 12 may request the host controller interface 16 to read data stored in the second storage area 120. Furthermore, the main processor 12 may program the direct memory access controller DMAC to store the read data in the random access memory 15, in step S610.

In step S620, the host controller interface 16 may execute a UFS-based data read on the second storage area 120 in response to the request of the main processor 12. For example, the host controller interface 16 may transmit a UNC-based read command UPIU to the controller 130.

The controller 130 may read data from the second storage area 120 and may transmit the read data to the host controller interface 16 in the form of a data input UPIU. For example, the read command UPIU may request a data read executed in the unit of several bytes.

For example, the host controller interface 16 may transmit two or more read UPIUs sequentially to the controller 130 in accordance with the data size requested by the main processor 12. According to the two or more read UPIUs, the controller 130 may transmit two or more data input UPIUs sequentially to the host controller interface 16.

In step S630, the direct memory access controller DMAC may load the data transmitted from the controller 130 onto the random access memory 15. In the case where specific data stored in the second storage area 120 are loaded on the random access memory 15, it may be possible to improve an operation speed in an operation using the specific data.

When it is necessary to process data at a typical speed, the main processor 12 and/or auxiliary processor 13 may directly access the second storage area 120. By contrast, when it is necessary to process data at a high speed, the main processor 12 and/or auxiliary processor 13 may load the data on the random access memory 15 using the direct memory access controller DMAC.

Figure 15:
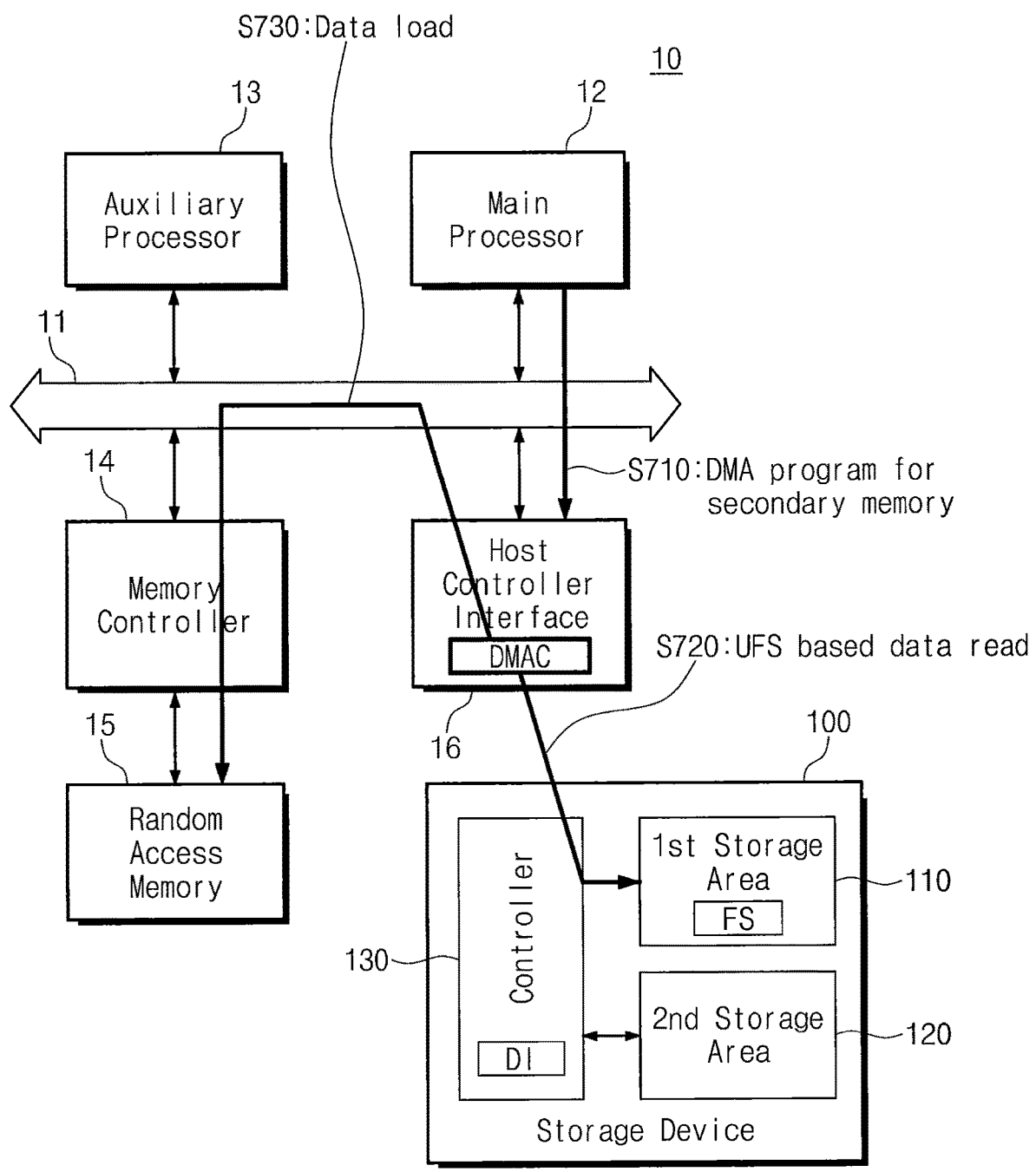
FIG. 15 illustrates an example in which a main processor loads data in a first storage area on a random access memory.

FIG. 15 illustrates an example in which the main processor 12 loads data in the first storage area 110 on the random access memory 15. In some embodiments, when the main processor 12 intends to access data stored in the first storage area 110, the main processor 12 may load the data stored in the first storage area 110 on the random access memory 15.

In certain embodiments, when the auxiliary processor 13 accesses data stored in the first storage area 110, the auxiliary processor 13 may request the data from the main processor 12. Then, the main processor 12 may load the data stored in the first storage area 110 on the random access memory 15, in response to the request of the auxiliary processor 13.

Referring to FIG. 15, the main processor 12 may request the host controller interface 16 to read data stored in the first storage area 110. Furthermore, the main processor 12 may program the direct memory access controller DMAC to store the read data in the random access memory 15, in step S710.

In step S720, the host controller interface 16 may execute a UFS-based data read on the first storage area 110 in response to the request of the main processor 12. For example, the host controller interface 16 may transmit a UFS standard read command UPIU to the controller 130.

The controller 130 may read data from the first storage area 110 and may transmit the read data to the host controller interface 16 in the form of a data input UPIU. For example, the read command UPIU may request a data read executed in the unit of several kilobytes.

For example, the controller 130 may transmit two or more data input UPIUs sequentially to the host controller interface 16 in accordance with a data size requested by the main processor 12 through each read command UPIU.

In step S730, the direct memory access controller DMAC may load the data transmitted from the controller 130 onto the random access memory 15. Thereafter, the main processor 12 and/or auxiliary processor 13 may use the data loaded on the random access memory 15.

Figure 16:
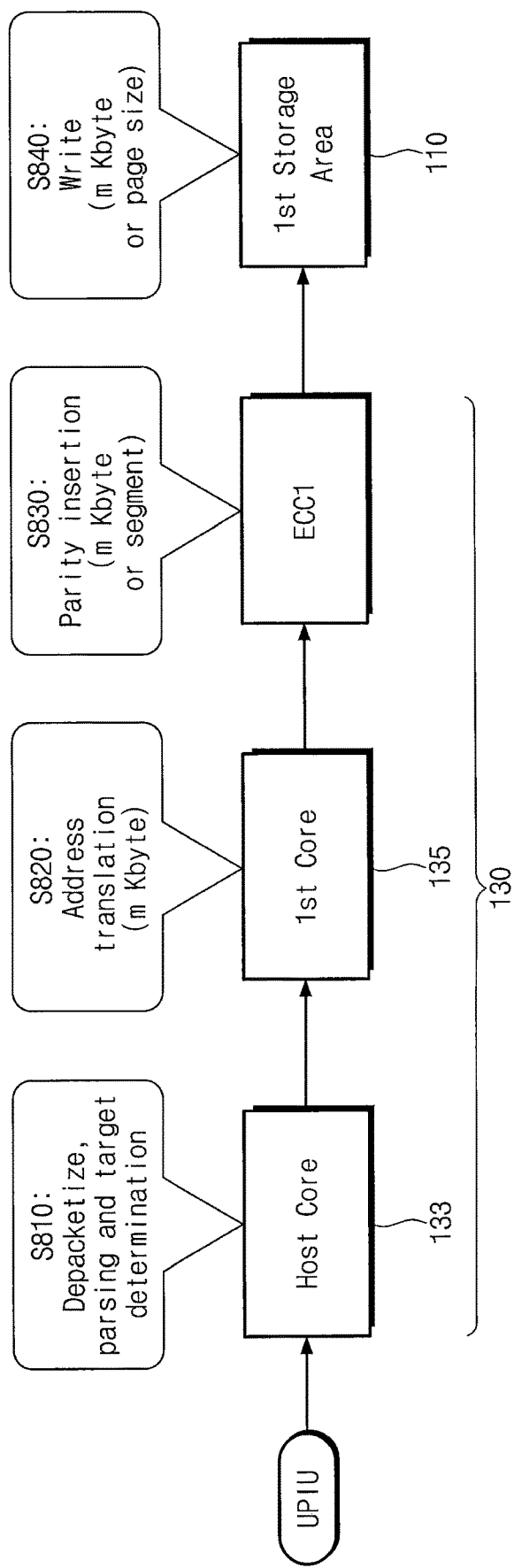
FIG. 16 illustrates an example in which a storage device according to some embodiments of the inventive concepts writes data in a first storage area.

FIG. 16 illustrates an example in which the storage device 100 according to some embodiments of the inventive concepts writes data in the first storage area 110. Referring to FIGS. 1, 4, and 16, the controller 130 may receive a UPIU from the host controller interface 16. For example, the controller 130 may receive a command UPIU requesting a write operation and a data output UPIU including data.

In step S810, the host core 133 of the controller 130 may depacketize the UPIU, parse the depacketized UPIU, and determine which of the first and second storage areas 110 and 120 is associated with the data. For example, the host core 133 may determine that the first storage area 110 is a writing destination of the data.

In step S820, the first core 135 of the controller 130 may execute an address conversion. For example, the command UPIU may include an address (e.g., a logical or virtual address) of the first storage area 110, in which the data will be written. The first core 135 may convert the address included in the command UPIU to a physical address of the first storage area 110. A unit size of the address conversion may be m kilobytes, where m is a positive integer.

In step S830, the first error correction code ECC1 of the controller 130 may execute an error correction encoding to insert error correction parity. A unit size of the error correction encoding may be m kilobytes that is equal to the unit size of the address conversion of the first core 135. In other words, the first error correction code ECC1 may insert the error correction parity whenever data of m kilobytes are written in the first storage area 110.

In certain embodiments, the unit size of the error correction encoding may be a segment. A size of the segment may be smaller than or greater than the unit size of the address conversion. However, the inventive concepts are not limited to a specific size of unit size of the error correction encoding.

In step S840, the first memory manager 136 of the controller 130 may instruct a write operation on the first storage area 110. A unit size of the write operation may be the m bytes, the segment or the page. The page may be a size of unit data processed in the read and write operations on the first storage area 110.

The read operation may be executed in the similar manner to the write operation described with reference to FIG. 16. For example, the first core 135 may execute the address conversion, the controller 130 may read data from the first storage area 110, and then, the first error correction code ECC1 may execute the error correction decoding. The controller 130 may transmit data, on which the error correction is executed, to the host controller interface 16.

In the above-described embodiments, some components are referred to by using the term "block." The "block" may be implemented with hardware, such as an integrated circuit (IC), an application specific IC (ASIC), a field programmable gate array (FPGA), and/or a complex programmable logic device (CPLD), software, such as firmware and applications, executed on hardware devices, or combinations of hardware and software. In addition, the "block" may include circuits or intellectual property (IP), which may be implemented with semiconductor devices in an IC.

According to some embodiments of the inventive concepts, a storage device is configured to support an access method of a secondary memory and an access method of a main memory. The access method of the main memory is for an auxiliary processor and in this access method, the auxiliary processor may access required data through a direct access to the storage device, without loading the required data on the main memory. Thus, it may be possible to reduce consumption in time, resource, and power of the storage device and thereby to provide a storage system including the storage device. In addition, a novel method of accessing the storage device is provided.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

While example embodiments of the inventive concepts have been particularly shown and described, it will be understood by one of ordinary skill in the art that variations in form and detail may be made therein without departing from the spirit and scope of the attached claims.

What is claimed is:

1. A storage device, comprising:
a first storage area;
a second storage area; and
a controller configured to provide device information containing information on the first storage area and the second storage area to an external host device, to allow a first access type of the external host device to the first storage area, and to allow a second access type of the external host device to the second storage area,
wherein the device information indicates that the first storage area stores a file system that is managed via the external host device and is accessed via the external host device based on the file system, and the second storage area is used as a random access memory independently of the file system,
wherein the first storage area is configured to be programmed using a first programming unit data size that is the same as a second programming unit data size of the second storage area, and
wherein a unit size of data communicated with the external host device in the second access type is smaller than the second programming unit data size and the unit size of data communicated with the external host device in the second access type is different from a unit size of data communicated with the external host device in the first access type.

2. The storage device of claim 1, wherein a unit size of data communicated in the first access type is several kilobytes, and the unit size of data communicated in the second access type is several bytes.

3. The storage device of claim 1, wherein the controller comprises:
a first flash translation layer, different from the file system, configured to convert a first logical address of the first storage area that is received from the external host device to a first physical address of the first storage area; and
a second flash translation layer, different from the file system, configured to convert a second logical address of the second storage area that is received from the external host device to a second physical address of the second storage area.

4. The storage device of claim 3, wherein a minimum size of data that may be addressed by the first logical address is different from a minimum size of data that may be addressed by the second logical address.

5. The storage device of claim 1, wherein the controller comprises:
a first error correction block configured to execute an error correction encoding or decoding in a first unit size of data, responsive to the controller accessing the first storage area; and
a second error correction block configured to execute the error correction encoding or decoding in a second unit size of data, responsive to the controller accessing the second storage area.

6. The storage device of claim 1, wherein the first access type is based on a first address system of a secondary memory having a minimum size of data that may be addressed equal to a first addressable unit size, and
wherein the second access type is based on a second address system of a main memory having a minimum size of data that may be addressed equal to a second addressable unit size that is smaller than the first addressable unit size.

7. The storage device of claim 1, wherein the first access type is executed when a request comprising a first code indicating the first access type is received, and
the second access type is executed when a request including a second code comprising the second access type is received.

8. The storage device of claim 1, wherein the first access type is executed responsive to receiving a first universal flash storage (UFS) protocol packet comprising a first code indicating the first access type, and
wherein the second access type is executed responsive to receiving a second UFS protocol packet comprising a second code indicating the second access type.

9. The storage device of claim 1, wherein the first storage area and the second storage area are a same type of non-volatile memory device.

10. A storage system, comprising:
a random access memory;
a storage device, different from the random access memory., comprising a first storage area and a second storage area, wherein the first storage area and the second storage area comprise non-volatile storage;
a direct memory access (DMA) controller communicatively coupled to the random access memory and the storage device;
a first processor configured to communicate with the DMA controller to load first data that is stored in the first storage area into the random access memory and to access the first data loaded into the random access memory; and
a second processor, different from the first processor, that is configured to directly access second data stored in the second storage area independently of communication with the DMA controller,
wherein the first processor is configured to access the first storage area utilizing a first access type having a minimum size of data that may be addressed that is equal to a first addressable unit size,
wherein the second processor is configured to access the second storage area utilizing a second access type having a minimum size of data that may be addressed that is equal to a second addressable unit size,
wherein the first storage area is configured to be programmed using a first programming unit data size that is the same as a second programming unit data size of the second storage area,
wherein the second addressable unit size is smaller than the second programming unit data size;
wherein the first addressable unit size is different than the second addressable unit size, and
wherein the first processor is configured to load the first data from the first storage area into the random access memory not through the second processor.

11. The storage system of claim 10, wherein the first processor is configured to access the first storage area based on a file system, and
wherein the second processor is configured to access the second storage area independently of the file system.

12. The storage system of claim 10, wherein the second processor is further configured to access the first data loaded into the random access memory by the first processor.

13. The storage system of claim 10, wherein the first processor is further configured to directly access the second data in the second storage area independently of the second processor.

14. The storage system of claim 10, wherein the first processor is further configured to load third data stored in the second storage area into the random access memory in response to a request of the second processor, and
wherein the second processor is further configured to access the third data loaded into the random access memory.

15. The storage system of claim 10, wherein the first processor comprises a central processing unit (CPU), and wherein the second processor comprises a neuromorphic processing unit (NPU) or a graphic processing unit (GPU).

16. A storage system, comprising:
a random access memory;
a storage device, different from the random access memory, comprising a first storage area and a second storage area;
a first processor configured to access the first storage area utilizing a first access type having a minimum size that may be addressed that is equal to a first unit size; and
a second processor, different from the first processor, that is configured to access second data stored in the second storage area utilizing a second access type having a minimum size that may be addressed that is equal to a second unit size that is different from the first unit size,
wherein the first processor uses the random access memory as a first random access memory, uses the first storage area as a first secondary memory, and uses the second storage area as a second secondary memory,
wherein the second processor uses the random access memory as the first random access memory, uses the second storage area as a second random access memory, and uses the first storage area as the first secondary memory, and
wherein the first storage area is configured to be programmed using a first programming unit data size that is equal to a second programming unit data size of the second storage area.

17. The storage system of claim 16, wherein the second processor is configured to access the second storage area using a command comprising an indicator that the access is independent of a file system of the storage device.

18. The storage system of claim 17, wherein the storage device comprises a controller, the controller comprising:
a first flash translation layer configured to convert a first logical address of the first storage area that is received from the first processor to a first physical address of the first storage area; and
a second flash translation layer configured to convert a second logical address of the second storage area that is received from the second processor to a second physical address of the second storage area,
wherein the controller is configured to access the first storage area using the first flash translation layer or the second storage area using the second flash translation layer based on the indicator of the command.

19. The storage system of claim 16, wherein the first unit size in which the access of the first access type is executed is greater than one kilobyte in length, and
wherein the second unit size in which the access of the second access type is executed is less than one kilobyte in length.

20. The storage system of claim 16, wherein the first storage area and the second storage area are implemented with a single nonvolatile memory device and logically divided by addresses.

* * * * *